UNITED STATES PATENT OFFICE.

FRANCIS ARTHUR FREETH, OF SANDIWAY, AND HERBERT EDWIN COCKSEDGE, OF LONDON, ENGLAND.

REMOVAL OF SODIUM SULFATE FROM SOLUTION.

1,343,443.  Specification of Letters Patent.  Patented June 15, 1920.

No Drawing.  Application filed October 30, 1918. Serial No. 260,350.

*To all whom it may concern:*

Be it known that we, FRANCIS ARTHUR FREETH and HERBERT EDWIN COCKSEDGE, both subjects of the King of Great Britain, and residing, respectively, at Sandiway, Cheshire, and London, both in the Kingdom of England, have invented certain new and useful Improvements in or Relating to the Removal of Sodium Sulfate from Solution, of which the following is a specification.

We have discovered a process whereby it is possible to extract sodium sulfate, without evaporation or cooling, from a saturated or nearly saturated solution of that salt, which solution may or may not contain other salts or substances.

Our process is as follows:—

We take any solution which is saturated, or nearly saturated with sodium sulfate at any given temperature and which may or may not contain other salts or substances and digest it at, or slightly above such temperature with a quantity of calcium sulfate, (preferably, but not necessarily anhydrous) sufficient to form the double salt of the formula $CaSO_4Na_2SO_4$, commonly known as "glauberite," and to leave a small excess of solid calcium sulfate. The solution after removal of the precipitate of calcium sodium sulfate admixed with a small quantity of calcium sulfate can then be used for any purpose for which it is desirable to have a solution containing less sodium sulfate than corresponds to saturation at a particular temperature.

Instead of forming the double salt $CaSO_4Na_2SO_4$ by the addition of calcium sulfate as such to the solution from which the sodium sulfate is to be removed, we may form the double salt by addition of any other calcium salt (such for instance as calcium chlorid or calcium nitrate) which reacts with sodium sulfate to form calcium sulfate, provided always that this alternative is confined to cases where the other compound formed by the reaction (for example sodium chlorid when calcium chlorid is used, or sodium nitrate when calcium nitrate is used) is not deleterious to the purpose for which the solution is subsequently to be employed.

Calcium sulfate and sodium sulfate may be recovered from the double salt $CaSO_4Na_2SO_4$ by digesting it with sufficient water to break it up and convert it into a mixture of solid calcium sulfate and a solution of sodium sulfate which may be recovered by any well known means.

We declare that what we claim is:—

1. The process for the extraction of sodium sulfate from a saturated or practically saturated solution of sodium sulfate at any given temperature containing other salts or substances, consisting in digesting such solution at or slightly above such temperature with a quantity of hydrated or anhydrous calcium sulfate to form the double salt $CaSO_4Na_2SO_4$, and removing such precipitate by any well known means.

2. The process for the extraction of sodium sulfate from a saturated or practically saturated solution of sodium sulfate at any given temperature containing other salts or substances, consisting in digesting such solution at or slightly above such temperature with a quantity of a soluble calcium salt, to form the double salt $CaSO_4Na_2SO_4$, and removing such precipitate by any well known means.

3. The process for removing sodium sulfate from solutions containing other salts or substances which consists in adding calcium sulfate to form the double salt $CaSO_4Na_2SO_4$ and then digesting said double salt with sufficient water to decompose it into a solution of sodium sulfate and a precipitate of calcium sulfate, and recovering such calcium sulfate and sodium sulfate by any well known means.

In witness whereof we have hereunto signed our names this 4th day of October, 1918, in the presence of two subscribing witnesses.

FRANCIS ARTHUR FREETH.
HERBERT EDWIN COCKSEDGE.

Witnesses:
JOHN MCLACHLAN,
HILDA STIRK.